United States Patent [19]
Khoury

[11] 3,838,338

[45] Sept. 24, 1974

[54] FREQUENCY MEASUREMENTS

[75] Inventor: Khalil Ibrahim Khoury, Bodmin, England

[73] Assignee: Flann Microwave Instruments Limited, Bodmin, Cornwall, England

[22] Filed: Oct. 9, 1973

[21] Appl. No.: 404,206

[52] U.S. Cl. ............................................ 324/79 D
[51] Int. Cl. ........................................... G01r 23/14
[58] Field of Search ..... 324/79 R, 79 D, 77 R, 77 E

[56] References Cited
UNITED STATES PATENTS

| | | | |
|---|---|---|---|
| 3,418,574 | 12/1968 | Wyckoff | 324/77 E |
| 3,473,121 | 10/1969 | Hurtig et al. | 324/77 E |
| 3,593,184 | 7/1971 | Herrero | 324/79 R |

*Primary Examiner*—Alfred E. Smith
*Attorney, Agent, or Firm*—Watson, Cole, Grindle & Watson

[57] ABSTRACT

This invention relates to a method of and an apparatus for automatically measuring the frequency of an input signal, particularly where the frequency of the signal to be measured lies above the upper limit of direct-counting frequency counters. The input signal to be measured is mixed simultaneously with a first reference signal and a number of consecutive harmonics thereof. A lowest beat frequency is extracted from the resulting beat frequencies. In order to obtain a value for the number of the nearest harmonic and to determine whether the input signal lies above or below this nearest harmonic, the first reference signal is increased and decreased by a known increment to obtain respective further lowest beat frequencies. The set of lowest beat frequencies is processed to compute the value of the frequency of the input signal. There are regions midway between adjacent harmonics where input signals cannot be measured, and thus to provide a continuous measurement range including these regions and also to provide a check on a measurement obtained with respect to the first reference signal, a further reference signal is used instead of the first reference signal and the measurement procedure is performed with another set of lowest beat frequencies. If required, further reference signals may be used to extend the measurement range.

20 Claims, 6 Drawing Figures

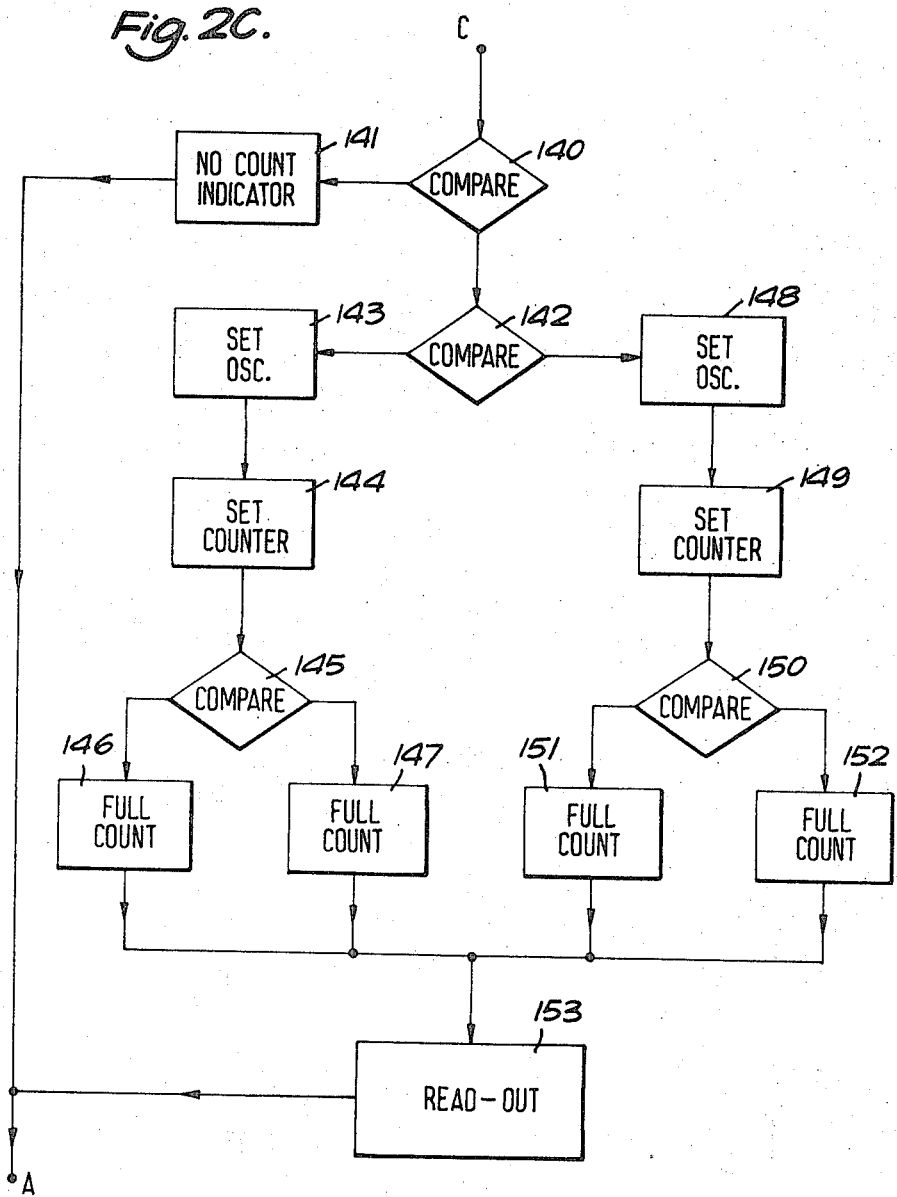

FREQUENCY MEASUREMENTS

BACKGROUND OF THE INVENTION

This invention relates to frequency measurement and is particularly, but not solely, concerned with measurement of frequencies lying above the upper limit of direct frequency counters.

For measuring the frequency of an input signal lying above the upper limit of a direct-counting frequency counter, it is known to mix a reference frequency with the input signal and to look for a beat frequency within the range of the direct frequency counter. If a measurable beat frequency is not produced, then the second and third and further consecutive harmonics are sequentially generated and sequentially mixed in ascending order with the input signal until the lowest harmonic is found which produces a measurable beat frequency. By a suitable choice of reference frequency there will be no ambiguity in the computed value for the frequency of the input signal, in other words the input signal will be known to lie above the lowest harmonic which produces a measurable beat frequency.

On this known method the steps of testing whether a given harmonic is the lowest harmonic which will produce a measurable beat frequency and of generating and mixing in sequence the next higher harmonics may be performed automatically. However, it will be appreciated that where an input signal lies near the upper limit of this known frequency measurement system, then many consecutive harmonics will have to be sequentially generated and mixed with the input signal.

SUMMARY

According to one aspect of this invention there is provided an apparatus for automatically measuring the frequency of an input signal, and comprising generating means for generating a reference signal having a preselected frequency, and a number of consecutive harmonics thereof, mixing means for mixing an input signal with the reference signal and each of the consecutive harmonics, and processing means for measuring a resulting beat frequency; and wherein the generating means is arranged to generate at least two sets of reference signals and their harmonics, a first set of which being based on the preselected frequencies $F_1$, $F_2$ and $F_3$ where $F_1 = F_2 - \Delta F = F_3 + \Delta F$, and a second set of which being based on the preselected frequencies $F_4$, $F_5$ and $F_6$ where $F_4 - F_5 - \delta F = F_6 + \delta F$, $\Delta F$ and $\delta F$ being preselected increments, and each of the reference signals being generated simultaneously with its harmonics wherein the mixing means is arranged, for each of the reference signals of the sets, to mix the input signal with a respective reference signal and its harmonics simultaneously; wherein the apparatus includes filtering means having a preselected cut-off frequency equal to less than half the difference between adjacent harmonics in order to extract a respective one of the resulting beat frequencies and to reject unseparable beat frequencies which arise where an input signal lies in a region disposed centrally between two adjacent harmonics; wherein the processing means is responsive to the respective extracted beat frequencies for a set of the reference signals for providing the value of the number of the harmonic of a selected one of the reference signals of the set, said harmonic being the nearest harmonic to the input signal, the value of the extracted beat frequency, and the sign of the difference between the input signal and said nearest harmonic; and wherein $F_1$, $F_4$, $\Delta F$, $\delta F$ and the cut-off frequency of the filtering means are selected such that a continuous measurement range extends over a selected number of the harmonics.

According to another aspect of this invention there is provided a method of automatically measuring the frequency of an input signal, and comprising the steps of generating a reference signal having a preselected frequency, and a number of consecutive harmonics thereof, mixing an input signal with the reference signal and each of the consecutive harmonics, and measuring a resulting beat frequency; the method being characterised by the step of generating at least two sets of reference signals and their harmonics, a first set of which being based on the preselected frequencies $F_1$, $F_2$ and $F_3$ where $F_1 = F_2 - \Delta F = F_3 + \Delta F$, and a second set of which being based on the preselected frequencies $F_4$, $F_5$ and $F_6$ where $F_4 - F_5 - \delta F = F_6 + \delta F$, $\delta F$ and $\delta F$ being preselected increments, and each of the reference signals being generated simultaneously with its harmonics; by the step of mixing, for each of the reference signals of the sets, the input signal with a respective reference signal and its harmonics simultaneously; by the step of extracting the respective lowest beat frequencies provided that the input signal lies outside a respective predetermined region disposed centrally between the respective neighbouring harmonics; and by the step of processing the respective extracted beat frequencies for a set of the reference signals for providing the value of the number of the harmonic of a selected one of the reference signals of the set, said harmonic being the nearest harmonic to the input signal, the value of the extracted beat frequency, and the sign of the difference between the input signal and said nearest harmonic; and by the step of preselecting $F_1$, $F_4$, $F$, $F$ and the respective predetermined regions such that a continuous measurement range extends over a selected number of the harmonics.

It is an object of the present invention to provide a novel method of and apparatus for automatically measuring the frequency of an input signal such that the measurement time is not a function of the harmonics of the reference signal.

It is a further object of this invention to provide a novel and improved method of and apparatus for automatically measuring the frequency of an input signal which lies above the upper limit of a direct-counting frequency counter.

In order to extend the measurement range beyond that available using only two sets of reference signals, one or more further sets of reference signals may be used.

There may be an individual channel for each of the preselected frequencies of the sets of reference signals. The mixing means may comprise a mixer in each channel and the filtering means may comprise a filter in each channel. The processing means may be arranged to accept the output from each of the filters in parallel or sequentially. Where the filter outputs are accepted in parallel, this would enable the processing means to provide the required output extremely rapidly. However, such speed of operation may not be required and sequential acceptance may be sufficient. The mixing means and the filtering means may comprise fewer mixers and filters than channels and the channels would then be multiplexed such that a mixer and a filter were connected to one of a number of channels in turn. There may be fewer channels than preselected frequencies and then one or more channels would operate at two or more preselected frequencies in turn. As will be explained later, it is expected that only two sets of reference signals i.e., $F_1$ to $F_6$, will be required and, from a cost view-point a single channel only may be used.

The apparatus may only provide the beat frequency, N and + or −. However, preferably there is provided means for computing the value of the input frequency from this data and for reading out the computed value.

In an apparatus where the processing means does not accept the beat frequencies from all the sets of reference signals in parallel, the processing means is arranged to control the connection, or generation, of the sets of reference signals in sequence. Thus where there is a plurality of channels, the switching between channels is controlled; and where there is a single channel, the signal generator is controlled to generate the sets sequentially. If the input signal cannot be measured with respect to any of the sets of reference signals the processing means may be arranged to provide an indication that the input signal is outside the measurement range of the apparatus. The indication may be the energising of an indicator lamp.

For the purpose of obtaining N and + or −, the processing means may measure the lowest beat frequencies, or may only sample each of the frequencies for the same sample period. However if sampling is used, the processing means must also make a full count of a selected lowest beat frequency.

Conveniently the known increments $\Delta F$ and $\delta F$ are equal in value. The predetermined frequency $F_4$ may be above or below the predetermined frequency $F_1$.

The operation of an apparatus in accordance with this invention and the interrelation between the various frequencies will be further clarified by the following explanation.

To measure an input signal $F_{IN}$, lying above the upper limit of a direct counter basically the input signal is fed ino a mixer where it is mixed with a known local oscillator frequency, $F_{L01}$ (which constitutes the reference signal $F_1$), so that a beat frequency, $F_B$, is obtained which lies within the frequency range of the direct counter. The value of the $F_{IN}$ is therefore expressed as $F_{L01} \pm F_B$, depending on whether $F_{IN}$ lies above or below $F_{L01}$.

To measure frequencies over a wide range, the mixer is simultaneously driven by harmonics of $F_{L01}$, and the input signal beats with the nearest harmonic to give the lowest beat frequency, and this can be separated from other beat frequencies by passing the mixer output through a low pass filter having a cut-off frequency, $F_{LP} < F_{L01}/2$. It will be thus seen that the input signal is now given by $F_{IN} = N F_{L01} \pm F_B$, where N is the number of the nearest harmonic.

Thus to evaluate the input frequency, it is necessary to determine both the value of N, and the correct sign (i.e. + or −) for $F_B$.

Due to the finite cut-off characteristics of the low pass filter, there will be a range of frequencies lying centrally between any two successive harmonics of the local oscillator frequency, for which range the filter cannot separate the beat frequencies and thus the counter will not give a correct count. To overcome this problem, the cut-off frequency of the filter is reduced to less than $F_{L01}/2$, in practice less than $(F_{L01} - \Delta F)/2$, such that frequencies which previously caused incorrect counts now give no counts. Frequencies lying within these ranges cannot be measured using the local oscillator frequency $F_{L01}$, and therefore to determine these frequencies, a second local oscillator, having a known frequency $F_{L02}$, (which constitutes the reference signal $F_4$) is substituted for the first local oscillator to provide coverage for the "no-count" regions. A third local oscillator may be used to extend the frequency coverage or allow increased separation of $F_{L01}$ and $F_{L02}$, but in most cases it will be sufficient to have just two local oscillators.

To determine the value of N and the correct + or − sign, the local oscillator frequency is shifted by a small amount $+\Delta F$, to give $F_{L01} + \Delta F$ i.e. $F_2$, and it will be apparent that the Nth harmonic will shift by $+N\Delta F$. If the input signal lies outside the frequency range defined by lower and upper limits, N $F_{L01}$ and N $(F_{L01} + \Delta F)$, respectively, then the beat frequency will increase or decrease by N $\Delta F$ for a signal frequency lower or higher, respectively, than $NF_{L01}$. Known techniques may be used to process the beat frequencies for $F_{L01}$ and $(F_{L01} + \Delta F)$ to provide the value of N and the sign.

If the input frequency lies within a "no-count" region, the second harmonic or higher harmonic of the input frequency can lie outside the "no-count" regions and if it (a) is of sufficient amplitude, and (b) falls within the frequency range of the system, then a false count and a false high value for N will result. By changing to the second local oscillator frequency, $F_{L02}$, a harmonic of $F_{L02}$ will be brought close enough to the fundamental of the input frequency to enable a correct count to be obtained. The correct and false counts are distinguished by their N values, the count having the higher N value being rejected as the false count.

It will not be necessary for the counter to make a full count of the beat frequency for the determination of N, since sufficient information will be available with a sample time corresponding to a duration of a few cycles of $\Delta F$. Because of a fundamental accuracy of $\pm 1$ to $\pm 2$ counts per measurement of the counter, it will be necessary to choose the minimum count to be not less than 6 to 8, and to round off all counts to an integer multiple of the minimum count.

If the input signal does lie between N $F_{L01}$ and N $(F_{L01} + \Delta F)$, then an incorrect value of N will be registered, for instance, if the input signal lies half-way between N $F_{L01}$ and N $(F_{L01} + \Delta F)$ then the beat frequency will not increase or decrease and will result in N appearing to be equal to zero. In this case the local oscillator frequency can be shifted by $-\Delta F$ to obtain the true value of N.

For input frequencies lying close to N $F_{L01}$, it is not possible to establish the correct sign for $F_B$ without a long sampling period, and therefore it is preferable to use $F_{L01} + $ or $- \Delta F$ to obtain $F_B$ and then to compute either:

$F_{IN} = N(F_{L01} + \Delta F) - F_B$ (measured using $F_{L01} + \Delta F$)

or $F_{IN} = N(F_{L01} - \Delta F) + F_B$ (measured using $F_{L01} - \Delta F$)

Thus it can be seen that to determine N and + or − for any input frequency within the counting range of the system, it is necessary to perform six short counting operations. This can be done either simultaneously on six channels or sequentially on one, two or three channels. It would appear to be cheapest to have one channel and to use sequential sampling.

As mentioned before, a local oscillator frequency of $F_{L02}$ is used to provide coverage for the "no-count" regions which occur when using $F_{L01}$. The maximum range of full frequency coverage is set by the difference between $F_{L01}$ and $F_{L02}$. The counting regions of the harmonics of $F_{L01}$ bear a vernier-like relation to the counting regions of the harmonics of $F_{L02}$. The upper limit of frequency measurement, for $F_{L01} > F_{L02}$, is just below a frequency central between two successive $F_{L01}$ harmonics that do not enclose an $F_{L02}$ harmonic. This can be arrived at by determining the highest value to the integer $n$ which satisfies the expression: $nF_{L01} - (n-1)F_{L02} \geq 0$. Thus the absolute upper limit would be $(n-1)F_{L01} + F_{LP}$. However in the embodiment to be described later the processing is arranged such that the determination of N and the ± sign can only proceed provided that $F_B \neq F_{LP}$ for both $(F_{L01} - \Delta F)$ and $(F_{L01} + \Delta F)$. This simplifies the computing sequence but at the cost of a reduction of the upper frequency limit to $(n-1)F_{L01} + F_{LP} - (n-1)\Delta F$. A further consequence of using this particular sequence is that to ensure adequate coverage of the "no-count" region between $(n-2)F_{L01}$ and $(n-1)F_{L01}$, the counting regions of $(n-2)F_{L01}$ and $(n-2)F_{L02}$ must overlap to an extent equal to twice $(n-2)\Delta F$. Thus an input signal at $(n-2)F_{L01} + F_{LP} - (n-2)\Delta F$ can be just measured using $F_{L01}$, and can also be just measured using $F_{L02}$, being expressed as $(n-2)F_{L02} - F_{LP} + (n-2)\Delta F$. Equating these two expressions gives $F_{L02}/2 = F_{L01} - F_{LP} + (n-2)\Delta F$, for the limiting condition. This equation relates the values of terms $F_{L01}$, $F_{L02}$, $F_{LP}$ and $\Delta F$, $n$ being determined by $F_{L01}$ and $F_{L02}$. Thus $F_{L01}$ and $F_{L02}$ can be chosen to give a suitable range of frequency measurement, and $F_{LP}$ and $\Delta F$ can be chosen to have convenient values. If $\Delta F$ is chosen to have a suitable value, the above equation sets a lower limit for $F_{LP}$, the upper limit being determined by the sharpness of the cut-off characteristic and the need to have a large attenuation at $F_{L01}/2$.

An apparatus in accordance with this invention can automatically measure the frequency of an input signal (provided it is within the measurement range) without requiring an approximate value of its frequency.

DESCRIPTION OF THE DRAWINGS

FIGS. 2A, 2B and 2C are a flow chart of the operating sequence of the frequency counter of FIG. 1;

DETAILED DESCRIPTION

Figure 1:
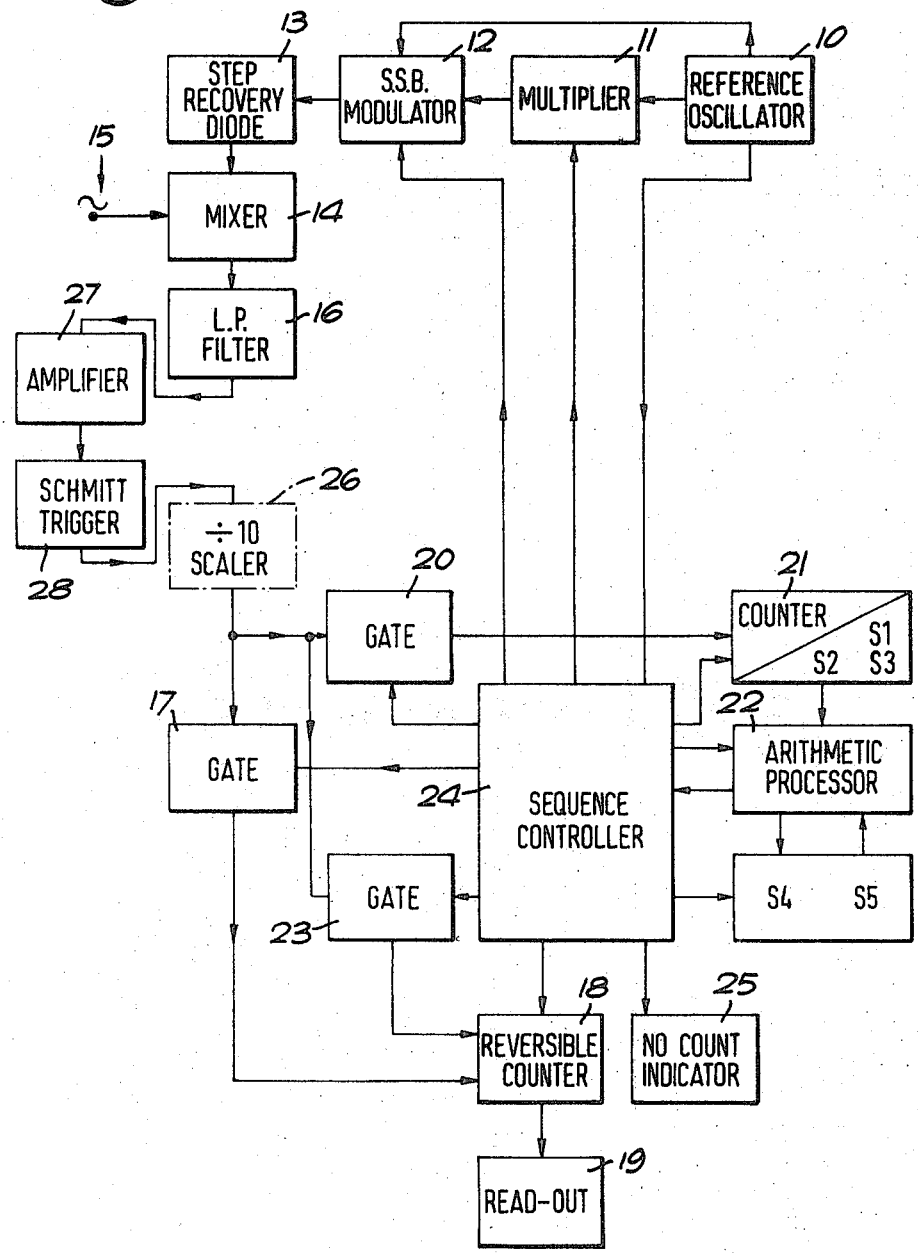
FIG. 1 is a block diagram of a frequency counter in accordance with this invention.

In FIG. 1 which shows a schematic diagram of a frequency counter in accordance with this invention, a reference oscillator 10 feeds a fundamental reference signal to a multiplier 11 which generates a local oscillator frequency $F_{L0}$ and feeds it to a single side band (S.S.B.) modulator 12. The oscillator also feeds a reference signal to the S.S.B. modulator. The modulator output is fed via a step recovery diode 13, which generates a range of harmonics of $F_{L0}$, to a mixer 14 into which is also fed an input signal 15 whose frequency is to be measured.

The output from the mixer 14 is fed to a low pass filter 16 to extract the lowest beat frequency, $F_B$, which is fed to a wide-bandwidth amplifier 27 followed by a Schmitt trigger 28. The trigger output is fed via a gate 17 to a count-up input of reversible counter 18, having a numerical read-out 19. The trigger output is also fed via gate 23 to a count-down input of the reversible counter 18.

The trigger output is fed via a gate 20 to a counter 21 and stores S1, S2 and S3. The counter 21 feeds an arithmetic processor 22 which feeds an output to, and accepts data from, stores S4 and S5.

A sequence controller 24 controls gates 17, 20 and 23, reversible counter 18, counter 21, stores S1, S2, S3 S4 and S5, arithmetic processor 22, S.S.B. modulator 12, multiplier 11, and NO COUNT indicator 25. The reference oscillator also provides a reference signal to the sequence controller in order to generate timing pulses for controlling the gates and the reversible counter.

If required, a ÷ 10 scaler 26 (shown in dashed line) may be connected to the output of the Schmitt trigger 28 to reduce the frequency fed to the gates 17, 20 and 21, and thus permit the use of a slower reversible counter, or enable a greater frequency range to be obtained.

In the aforedescribed frequency counter, the local oscillator frequency $F_{L01}$ is 700 MHz, $F_{L02}$ is 750 MHz, $\Delta F$ is 1 MHz and $F_{LP}$ is approximately 340 MHz.

Ideally the filter 16 should have a flat response to $F_{LP}$ and infinite attenuation above $F_{LP}$. In practice the filter 16 is designed such that the attenuation at 340 MHz is < 1 dB and that at 350 MHz is > 40 dB. This is a sufficient approximation to the ideal characteristic and it is therefore convenient to refer to the cut-off frequency $F_{LP}$ as being 340 MHz.

The frequency range of the frequency counter will be from $(700-340)$MHz = 360 MHz, up to $[14(700) + 340 - 14]$MHz = 10,126 MHz. This lower limit of 360 MHz is chosen to be lower than the upper limit of 370 MHz of currently available direct measurement frequency counters. Conveniently the frequency counter readout can be four or more digits, with the readout being in GHz.

Figure 2A:
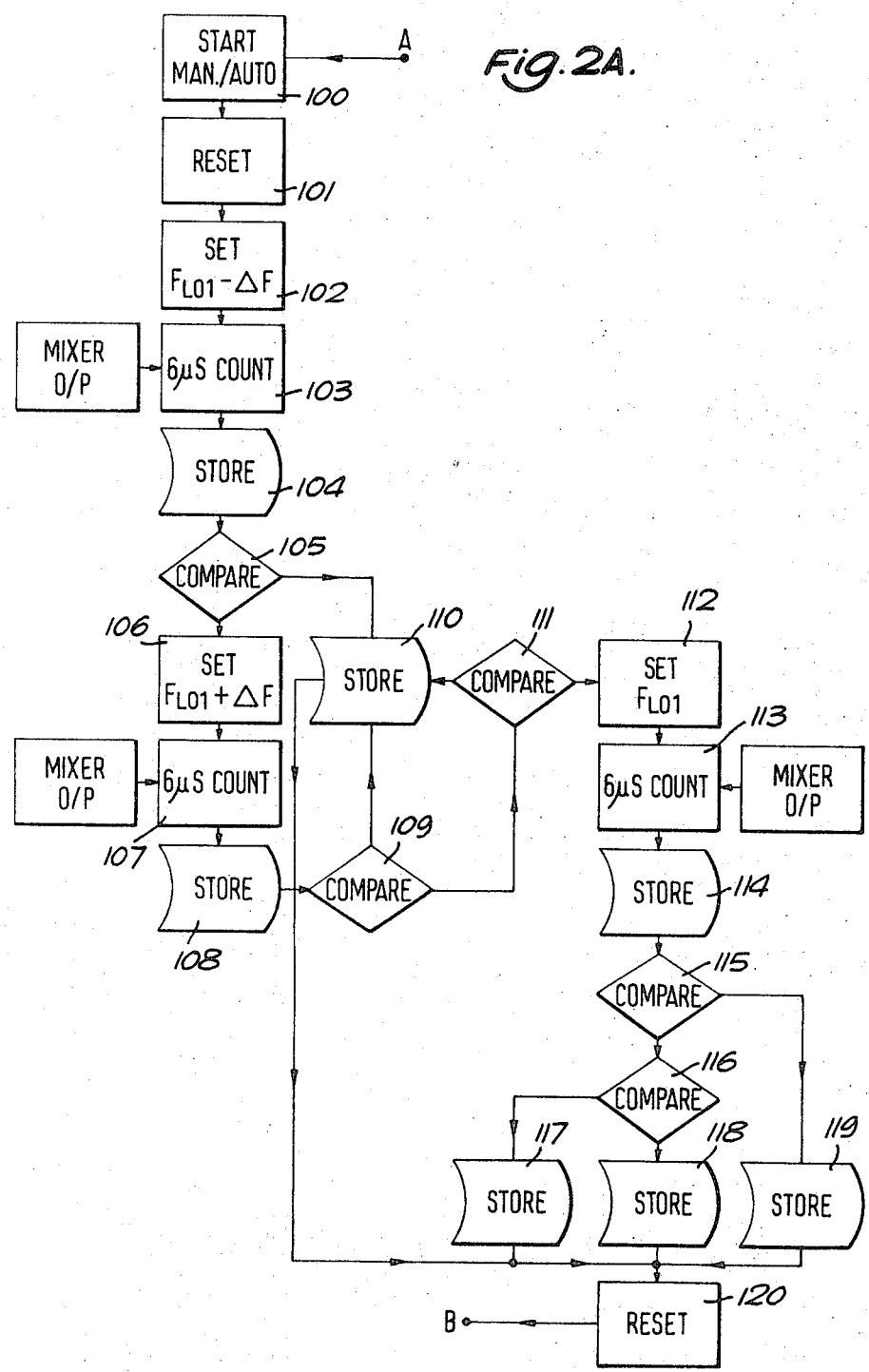
Figure 2B:
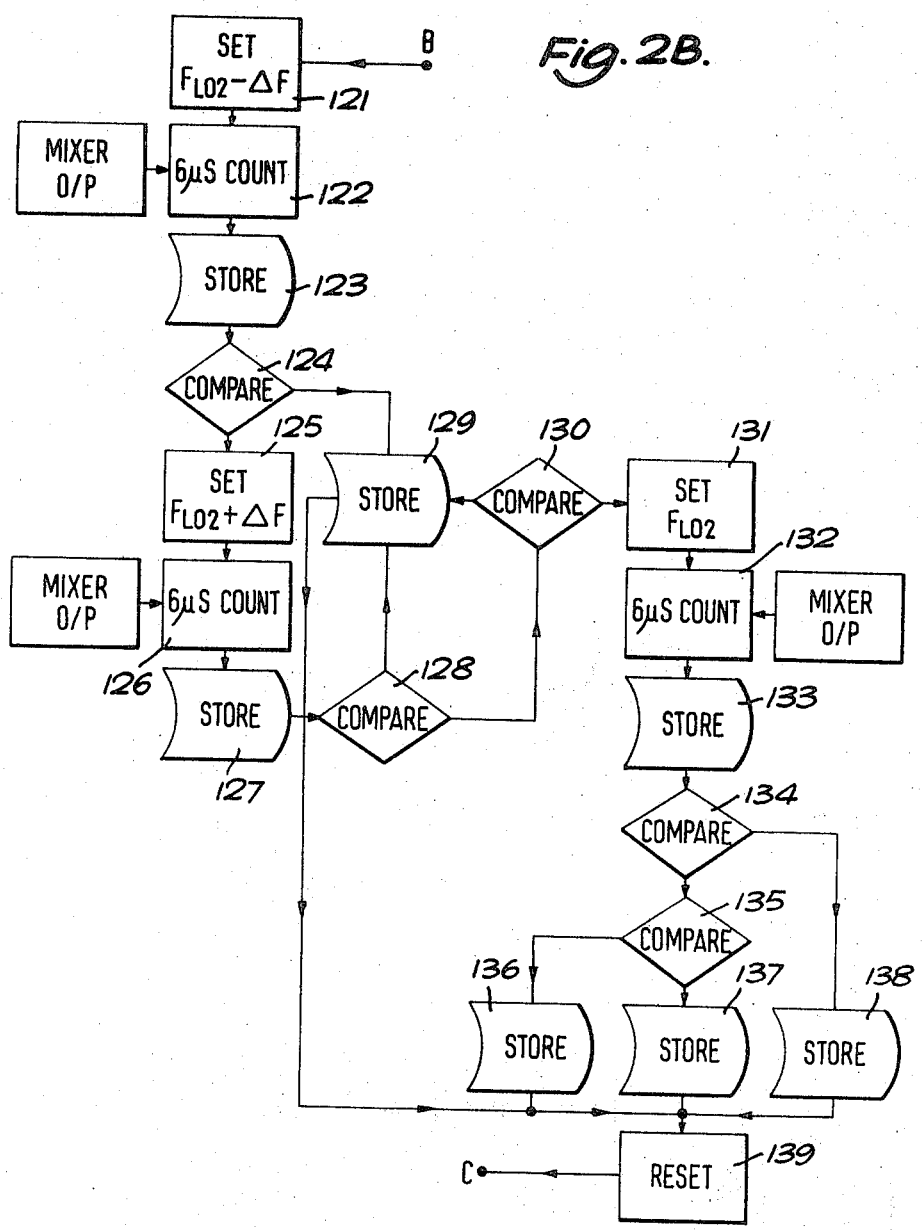

FIGS. 2A, 2B and 2C show the flow chart, or sequence steps, of one embodiment of the frequency counter of FIG. 1. The following paragraphs set out the sequence steps and are numbered from 100.

100 Start sequence. The command may be manual, e.g., derived from actuation of a push button, or may be automatically derived at the finish of a previous sequence.

101 Stores S1, S2, S3, S4 and S5, and counters 18 and 21 are reset.

102 The local oscillator 10 is set to $F_{L01} - \Delta F$, and counter 21 is connected to store S1.

103 Gate 20 is opened for 6µS.

104 The count in counter 21 is stored in S1 as count C1

105 Count C1 is compared with 2,048. If C1<2048 go to 106: if C1 ≥ 2048 go to 110.

106 The local oscillator 10 is set to $F_{L01} + \Delta F$, and counter 21 is connected to store S2.

107 Gate 20 is opened for 6µS.

108 The count in counter 21 is stored in S2 as count C2.
109 Count C2 is compared with 2048. If C2<2048 go to 111: if C2 ≥ 2048 go to 110.
110 Store N1 = 16 in store S4, and go to 120.
111 Count C1 is added to count C2 and C1 + C2 is compared with 8. If C1 + C2<8 go to 110: if C1 + C2 ≥ 8 go to 112.
112 The local oscillator 10 is set to $F_{L01}$, and counter 21 is connected to store S3.
113 Gate 20 is opened for 6μS.
114 The count in counter 21 is stored in S3 as C3.

115 C1 + C2 is compared with 4C3. If C1 + C2<4C3 go to 116: if C1 + C2 ≥ 4C3 go to 119.

116 Count C1 is compared with count C2. If C1<C2 go to 117: if C1>C2 go to 118.
117 In store S4 store N1 = (C2 − C3)/6; sign −; and $F = F_{L01}$. Then go to 120.
118 In store S4 store N1 = (C1−C3)/6; sign +; and $F = F_{L01}$. Then go to 120.
119 In store S4 store N1 = (C1 + C2)/12; sign +; and $F = F_{L01} - \Delta F$. Then go to 120.
120 Stores S1, S2 and S3 are reset.
121 The local oscillator 10 is set to $F_{L02} - \Delta F$.
122 to 139 These sequence steps correspond (mutatis mutandis) to 103 to 120, respectively, but with the following exceptions: In steps 125, 131, 136, 137 and 138 for $F_{L01}$ read $F_{L02}$; in steps 129, 136, 137 and 138 for N1 read N2; and in steps 129, 136, 137 and 138 for S4 and S5.
140 N1 and N2 are compared with 16. If N1 = N2 = 16 go to 141: otherwise go to 142.
141 The NO COUNT indicator 25 is energized, and a start signal is provided.
142 N1 is compared with N2. If N1 ≤ N2 go to 143: if N1>N2 go to 148.
143 The local oscillator is set to the frequency stored in S4.
144 Counter 18 is preset to N1 times the frequency stored in S4.
145 The sign stored in S4 is interrogated. If − go to 146; if + go to 147.
146 Gate 20 is opened and counter 18 counts down for a full counting period. Then go to 153.
147 Gate 17 is opened and counter 18 counts up for a full counting period. Then go to 153.
148 to 152 These sequence steps are identical with 143 to 147, respectively, but with the following exceptions:
In steps 148, 149 and 150 for S4 read S5; in step 149 for N1 read N2.
153 The final number in counter 18 is displayed, and start signal is provided.

If a third local oscillator frequency was used, or if a few "no-count" regions were acceptable, then provided that the harmonic range of the step recovery diode is sufficiently large, the frequency range can extend beyond 15 $F_{L01}$. It may extend to 30 $F_{L01}$ or beyond. Without using a third local oscillator frequency "no-count" regions would be encountered between 14 $F_{L01}$ and 15 $F_{L01}$, 15$F_{L01}$ and 16 $F_{L01}$, 29 $F_{L01}$ and 30 $F_{L01}$, etc.

The reversible counter 18 may have only a single digit for indicating GHz, and there may be an overflow indicator so that frequencies above 9.999 GHz can be measured. Thus frequencies to 19.999 GHz can be read out, and if so desired harmonics up to and including the 28th can be used, i.e., those above the 28th will cause ambiguity in the value of the overflow. In this case in sequence steps 110 and 129, the number 16 can be replaced by 29 and the instruction at step 140 could be along the lines: If N1 = N2 = 29; then go to 141.

Figure 3:
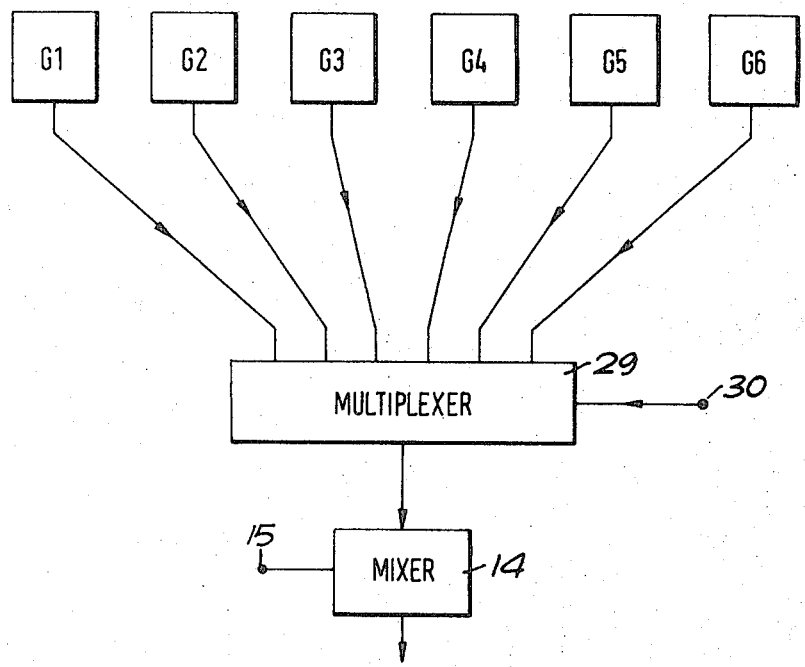
FIG. 3 shows a modification of part of the frequency counter of FIG. 1.

In FIG. 3 there is shown an arrangement having six separate reference signal generators $G_1$ to $G_6$ corresponding to reference signals $F_1$ to $F_6$. Each generator includes a respective step recovery diode in order to generate a range of consecutive harmonics of the reference signal. The output signals from the generators $G_1$ to $G_6$ are fed to a multiplexer 29 which connects one of the generators at a time to a mixer 14. The multiplexer is controlled by a signal fed to its control input 30 from the sequence controller 24 (FIG. 1). The switching sequence may be preselected, for example being the same as set out in FIGS. 2A to 2C. If required more than one mixer can be used, for example there may be three mixers, each associated with a respective pair of generators via the multiplexer.

Figure 4:
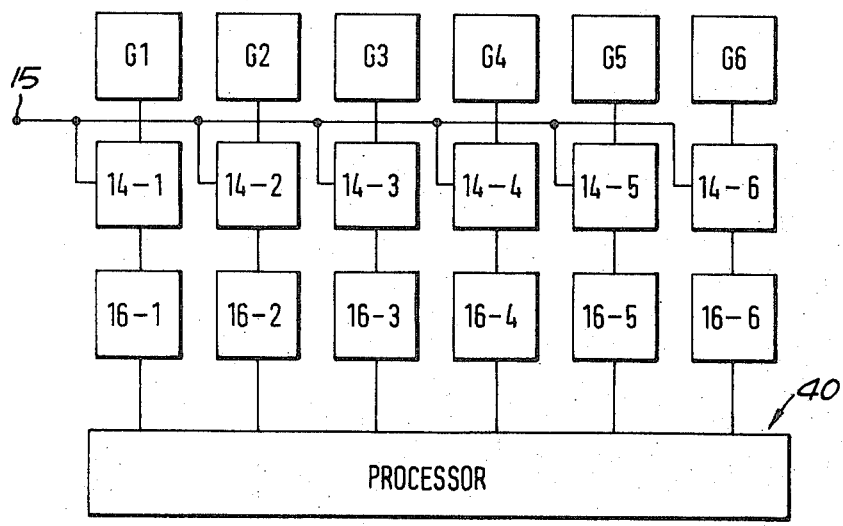
FIG. 4 shows a further modification of part of the frequency counter of FIG. 1.

FIG. 4 shows an arrangement of six individual reference signal generators $G_1$ to $G_6$ each feeding a corresponding individual mixer 14-1 to 14-6. The mixers are each coupled to corresponding individual filters 16-1 to 16-6 which in turn feed six inputs of a processor 40. The processor 40 may be arranged to process the data in parallel or sequentially.

I claim:
1. Apparatus for automatically measuring the frequency of an input signal, and comprising generating means for generating a reference signal having a preselected frequency, and a number of consecutive harmonics thereof, mixing means for mixing an input signal with the reference signal and each of the consecutive harmonics, and processing means for measuring a resulting beat frequency; and wherein the generating means is arranged to generate at least two sets of reference signals and their harmonics, a first set of which being based on the preselected frequencies $F_1$, $F_2$ and $F_3$ where $F_1 = F_2 - \Delta F = F_3 + \Delta F$, and a second set of which being based on the p reselected frequencies $F_4$, $F_5$ and $F_6$ where $F_4 - F_5 - \delta F = F_6 + \delta F$, $\Delta F$ and $\delta F$ being preselected increments, and each of the reference signals being generated simultaneously with its harmonics; wherein the mixing means is arranged, for each of the reference signals of the sets, to mix the input signal with a respective reference signal and its harmonics simultaneously; wherein the apparatus includes filtering means having a preselected cut-off frequency equal to less than half the difference between adjacent harmonics in order to extract a respective one of the resulting beat frequencies and to reject unseparable beat frequencies which arise where an input signal lies in a region disposed centrally between two adjacent harmonics; wherein the processing means is responsive to the respective extracted beat frequencies for a set of the reference signals for providing the value of the number of the harmonic of a selected one of the reference signals of the set, said harmonic being the nearest harmonic to the input signal, the value of the extracted beat frequency, and the sign of the difference between the input signal and said nearest harmonic; and wherein $F_1$, $F_4$, $\Delta F$, $\delta F$ and the cut-off frequency of the filtering means are selected such that a continuous measurement range extends over a selected number of the harmonics.

2. An apparatus as recited in claim 1 wherein the generating means is arranged to generate each of the reference signals of each of the sets simultaneously, the mixing means comprises respective individual mixers, the filtering means comprises respective individual filters, and the processing means is arranged to accept the respective extracted beat frequencies in parallel.

3. An apparatus as recited in claim 1 wherein the generating means is arranged to generate each of the reference signals of each of the sets simultaneously, the mixing means comprises at least one mixer, but fewer mixers than generated reference signals, and wherein there is provided multiplexing means for switching a mixer to receive in turn each of a plurality of generated reference signals.

4. An apparatus as recited in claim 3 wherein the processing means is arranged to control the multiplexing means such that the processing means receives the lowest beat frequencies for the sets of reference signals in synchronism with the processing of the lowest beat frequencies by the processing means.

5. An apparatus as recited in claim 1 wherein the generating means comprises a single controllable generator arranged to generate sequentially each of the reference signals of each of the sets, the mixing means comprises a single mixer, the filtering means comprises a single filter, and the processing means is arranged to accept the extracted beat frequencies serially.

6. An apparatus as recited in claim 5 wherein the processing means is arranged to control the controllable generator such as to generate the sets of reference signals in synchronism with the processing of the extracted beat frequencies by the processing means.

7. An apparatus as recited in claim 6 wherein the processing means is arranged to provide an indication if the input signal cannot be measured with respect to any of said sets of reference signals.

8. An apparatus as recited in claim 1 wherein the processing means is arranged to compute and read-out the value of the input signal.

9. An apparatus as recited in claim 1 wherein the generating means is arranged such that $\Delta F$ is equal to $\delta F$.

10. An apparatus as claimed in claim 1 wherein the processing means is arranged to process the extracted beat frequencies from two of the sets of reference signals and to select for read-out the processed data having a lower value of the number of the nearest harmonic of the corresponding reference signal.

11. An apparatus for automatically measuring the frequency of an input signal, and comprising controllable generating means for generating one at a time of six reference signals which form two sets $F_1$ to $F_3$ and $F_4$ to $F_6$, where $F_1 = F_2 - \Delta F = F_3 + \Delta F$ and $F_4 = F_5 - \Delta F = F_6 + \Delta F$, $\Delta F$ being a preselected increment, the generating means being arranged to generate a reference signal simultaneously with a number of consecutive harmonics of the generated reference signal; mixing means for mixing an input signal with a generated reference signal and its harmonics; filtering means for providing at an output an extracted lowest beat frequency from the resulting beat frequencies, the filtering means having a cut-off frequency less than half the frequency of the lowest reference signal whereby ambiguity is avoided where an input signal lies approximately midway between adjacent harmonics; and processing means responsive to the output of the filtering means for processing the lowest beat frequencies, the processing means being arranged to control the controllable generating means to generate preselected reference signals in accordance with a predetermined schedule in order to provide a sufficient number of lowest beat frequencies for processing, the processing means being also arranged to display one of the computed frequency of the input signal and an indication that the input signal lies outside the measurement range of the apparatus; $F_1$, $F_4$, $F$ and the cut-off frequency of the filtering means being interrelated such that a continuous measurement range extends over a selected number of the consecutive harmonics.

12. A method of automatically measuring the frequency of an input signal, and comprising the steps of generating a reference signal having a preselected frequency, and a number of consecutive harmonics thereof, mixing an input signal with the reference signal and each of the consecutive harmonics, and measuring a resulting beat frequency; the method being characterised by the step of generating at least two sets of reference signals and their harmonics, a first set of which being based on the preselected frequencies $F_1$, $F_2$ and $F_3$ where $F_1 = F_2 - \Delta F = F_3 + \Delta F$, and a second set of which being based on the preselected frequencies $F_4$, $F_5$ and $F_6$ where $F_4 - F_5 - \delta F = F_6 + \delta F$, $\Delta F$ and $\delta F$ being preselected increments, and each of the reference signals being generated simultaneously with its harmonics; by the step of mixing, for each of the reference signals of the sets, the input signal with a respective reference signal and its harmonics simultaneously; by the step of extracting the respective lowest beat frequencies provided that the input signal lies outside a respective predetermined region disposed centrally between the respective neighbouring harmonics; and by the step of processing the respective extracted beat frequencies for a set of the reference signals for providing the value of the number of the harmonic of a selected one of the reference signals of the set, said harmonic being the nearest harmonic to the input signal, the value of the extracted beat frequency, and the sign of the difference between the input signal and said nearest harmonic; and by the step of preselecting $F_1$, $F_4$, $\Delta F$, $\delta F$ and the respective predetermined regions such that a continuous measurement range extends over a selected number of the harmonics.

13. A method as recited in claim 12 wherein the generating step comprises simultaneously generating the respective reference signals; the mixing step comprises simultaneously and respectively mixing the input signal with the reference signals; the respective lowest beat frequencies are extracted simultaneously; and the processing step comprises accepting the respective lowest beat frequencies in parallel.

14. A method as recited in claim 12 wherein the generating step comprises simultaneously generating the respective reference signals; the mixing step is performed by means of at least one mixer, but fewer mixers than generated reference signals; and including the step of switching at least one mixer to receive in turn each of an associated plurality of generated reference signals.

15. A method as recited in claim 12 wherein the generating step comprises sequentially generating the reference signals; the mixing step is performed sequentially by means of a single mixer; and the processing step comprises accepting the respective lowest beat frequencies serially.

16. A method as recited in claim 15 wherein he generating step comprises generating the sets of reference signals in synchronism with the processing step.

17. A method as recited in claim 16 and including the step of providing an indication if the input signal cannot be measured with respect to any of said sets of reference signals.

18. A method as recited in claim 12 and including the step of computing and reading-out the value of the input signal.

19. A method as recited in claim 12 wherein the generating step comprises generating the reference frequencies such that $\Delta F$ is equal to $\delta F$.

20. A method as recited in claim 12 wherein the processing step comprises processing the lowest beat frequencies from teo of the sets of reference signals, and selecting for read-out the processed data having a lower value of the number of the nearest harmonic of the corresponding reference signal.

* * * * *